United States Patent [19]

Gladrow

[11] 4,151,121
[45] Apr. 24, 1979

[54] HYDROCARBON CONVERSION CATALYST CONTAINING A CO-OXIDATION PROMOTER

[75] Inventor: Elroy M. Gladrow, Baton Rouge, La.

[73] Assignee: Exxon Research & Engineering Co., Florham Park, N.J.

[21] Appl. No.: 863,512

[22] Filed: Dec. 22, 1977

Related U.S. Application Data

[63] Continuation-in-part of Ser. No. 676,043, Apr. 12, 1976, abandoned.

[51] Int. Cl.$^2$ .............................................. B01J 29/06
[52] U.S. Cl. ................................ 252/455 Z; 252/416; 208/120
[58] Field of Search ..................... 252/455 Z; 208/120

[56] References Cited

U.S. PATENT DOCUMENTS

| | | | |
|---|---|---|---|
| 3,364,136 | 1/1968 | Chen et al. | 208/120 |
| 4,072,600 | 2/1978 | Schwartz | 208/120 |

Primary Examiner—Carl Dees
Attorney, Agent, or Firm—Roy J. Ott; J. H. Callwood

[57] ABSTRACT

A cracking catalyst for promoting the oxidation of carbon monoxide to carbon dioxide during regeneration of the catalyst by the burning of coke therefrom, which comprises a crystalline aluminosilicate zeolite, an inorganic porous oxide matrix material and a CO oxidation promoter, such as a Group VIII metal or compound thereof. The catalyst is preferably prepared by first supporting the CO oxidation promoter on an inorganic porous oxide base, such as alumina, and thereafter embedding the supported CO oxidation promoter and a crystalline aluminosilicate zeolite, such as rare earth metal exchanged Y-type zeolite, in an inorganic porous oxide matrix material, such as silica-alumina.

10 Claims, No Drawings

HYDROCARBON CONVERSION CATALYST CONTAINING A CO-OXIDATION PROMOTER

CROSS REFERENCE TO RELATED APPLICATIONS

This application is a continuation-in-part of copending application Ser. No. 676,043, filed Apr. 12, 1976 now abandoned.

BACKGROUND OF THE INVENTION

1. Field of the Invention

This invention relates to a catalyst composition, a method of making the catalyst, and its use in the catalytic conversion of hydrocarbon oils. More particularly, the invention is concerned with a fluid cracking catalyst comprising a crystalline aluminosilicate zeolite, an inorganic oxide matrix and a metal which promotes the oxidation of carbon monoxide to carbon dioxide during regeneration of the catalyst by the burning of coke therefrom.

2. Description of the Prior Art

Various processes such as cracking, hydrocracking, etc. are known for the conversion of hydrocarbons to lower molecular weight products. The catalytic cracking of heavy petroleum fractions is one of the major refining operations employed in the conversion of crude petroleum oils to desirable fuel products such as heating oils and high octane gasoline. Illustrative of "fluid" catalytic conversion processes is the fluid catalytic cracking process wherein suitably preheated high molecular weight hydrocarbon liquids and vapors are contacted with hot, finely-divided, solid catalyst particles, either in a fluidized bed reactor or in an elongated riser reactor, and maintained at an elevated temperature in a fluidized or dispersed state for a period of time sufficient to effect the desired degree of cracking to lower molecular weight hydrocarbons.

In the catalytic process, some non-volatile carbonaceous material, or "coke," is deposited on the catalyst particles. As coke builds up on the catalyst, the activity of the catalyst for cracking and the selectivity of the catalyst for producing desirable products diminish. The catalyst particles may recover a major proportion of their original activity by removal of most of the coke by a suitable regeneration process. Catalyst regeneration is accomplished by burning the coke deposits from the catalyst surface with an oxygen-containing gas, such as air. Many regeneration techniques are practiced commercially whereby a significant restoration of catalyst activity is achieved. The burning of coke deposits from the catalysts requires a large volume of oxygen or air and produces substantial quantities of CO and $CO_2$. Ordinarily, the regeneration is conducted at a temperature ranging from about 1050° to about 1250° F. The effect of any increase in temperature is reflected in an increased rate of combustion of carbon and a more complete removal of carbon, or coke, from the catalyst particles.

A major problem often encountered in the practice of fluid catalyst regeneration is the phenomenon known as "afterburning," which is descriptive of the further combustion of CO to $CO_2$. The operators of fluid catalyst regenerators avoid afterburning because it could lead to very high temperatures which are damaging to equipment and possibly to the catalyst particles.

More recently, as operators have sought to raise regenerator temperatures for various reasons, elaborate arrangements have also been developed for control of regenerator temperatures at the point of incipient afterburning by suitable means for control of the oxygen supplied to the regenerator. However, with the control of afterburning, the flue gas from catalyst regenerators usually contains very little oxygen and a substantial quantity of CO and $CO_2$. In order to substantially eliminate the CO from the flue gas and to recover heat energy from the combustion of CO to $CO_2$, the regenerator flue gas is generally sent to a CO boiler wherein the combustion of CO is performed.

There has appeared in the literature, e.g., U.S. Pat. Nos. 2,382,382 and 3,563,911, various techniques for substantially eliminating both uncontrolled afterburning and the presence of CO in the regenerator effluent flue gas. These techniques generally involve the use of relatively high regeneration temperatures, e.g., 1275°–1400° F., and the presence of relatively high concentrations of $O_2$ in the regenerator so that there is substantially complete combustion of the spent catalyst coke to $CO_2$ in the regeneration vessel.

It has also been disclosed in the literature, e.g., U.S. Pat. Nos. 2,414,002; 2,436,927; 2,647,860, 3,650,990 and 3,788,977, that the presence of CO in the regenerator effluent gas from a catalytic cracking operation can be substantially reduced by incorporating a small amount of a CO oxidation promoter in the cracking catalyst composition. For example, cracking catalyst composites consisting of a crystalline aluminosilicate zeolite, a silica-alumina matrix and a small amount of platinum or palladium are known to produce relatively small amounts of CO during the regeneration thereof. Catalysts prepared in accordance with the present invention have improved characteristics as compared to the prior art cracking catalysts.

SUMMARY OF THE INVENTION

A hydrocarbon conversion catalyst for promoting the oxidation of carbon monoxide to carbon dioxide during regeneration of the catalyst by the burning of coke therefrom is prepared by first supporting a CO oxidation promoter on an inorganic porous oxide base and thereafter embedding the supported CO oxidation promoter and a crystalline aluminosilicate zeolite in an inorganic porous oxide matrix.

DETAILED DESCRIPTION OF THE INVENTION

The catalyst of the invention comprises a metal or compound thereof which promotes the combustion of CO to $CO_2$ under conditions which are employed to regenerate the spent catalyst by burning the coke deposited thereon in the presence of oxygen. Accordingly, the catalyst will contain one or more metals (or compounds thereof) selected from Periods 5 and 6 of Group VIII of the Periodic Table (Handbook of Chemistry and Physics, 38th Ed., 1957), rhenium, chromium and manganese or their compounds. Specific examples of such metals include platinum, palladium, rhenium, iridium, ruthenium, rhodium, osmium, manganese, etc. The aforedescribed metals may also be present in the oxidized state of an oxide, sulfide, or other.

The inorganic porous oxide used as a base and/or matrix in the catalyst composition of the invention will include any of the readily available porous materials such as alumina, boria, silica, chromia, magnesia, zirconia, titania, the like, and mixtures thereof. These materials may also include one or more of the various well known clays such as montmorillonite, kaolin, halloysite, bentonite, attapulgite, and the like. Preferably, the inorganic porous oxide will be one or more of the conventional siliceous varieties containing a major amount of silica and a minor amount of an oxide of at least one metal in Groups II-A, III-A and IV-B of the Periodic Table (Handbook of Chemistry and Physics, 38th Ed., 1957). Representative materials include silica-alumina, silica-magnesia, silica-zirconia, silica-thoria, silica-titania, silica-alumina-zirconia, magnesia, etc. The most preferred inorganic porous oxide used as a support for the CO oxidation promoter is alumina. The most preferred inorganic porous oxide matrix material is silica-alumina. As is generally known, these materials are typically prepared from silica hydrogel or hydrosol, which is mixed with alumina to secure the desired silica-alumina composition. The alumina content will typically range from about 5 to 40 wt. % with the preferred composition having an alumina content of about 10 to 35 wt. %. Various procedures are described in the literature for making silica-alumina, e.g., U.S. Pat. Nos. 2,908,635 and 2,844,523.

The crystalline aluminosilicate zeolites used in the catalyst composition of the present invention are well known and conventionally used in hydrocarbon conversion processes. The crystalline aluminosilicate zeolites, commonly referred to as "molecular sieves," are characterized by their highly ordered crystalline structure and uniformly dimensioned pores, and are distinguishable from each other on the basis of composition, crystal structure, adsorption properties, and the like. In general, the crystalline aluminosilicate zeolites will have uniform pore openings of about 3–15 Angstrom units, preferably about 6–13 Angstrom units. These values refer to the effective pore diameter of the pore openings, i.e., the diameter at the conditions of use capable of substantially admitting entry to smaller size molecules while substantially excluding larger size molecules.

A number of naturally occurring crystalline aluminosilicate zeolites or molecular sieves are known and include such materials as faujasite, mordenite, erionite, chabazite, and the like. Synthetically produced zeolites or molecular sieves are also well known and include such materials as zeolite A (U.S. Pat. No. 2,882,243), zeolite X (U.S. Pat. No. 2,882,244), zeolite K-G (U.S. Pat. No. 3,055,654), zeolite ZK-5 (U.S. Pat. No. 3,247,195), zeolite Y (U.S. Pat. No. 3,130,007), etc. Preferred crystalline aluminosilicates include synthetic faujasite or zeolites X and Y, with particular preference being accorded zeolite Y.

For use in hydrocarbon conversion processes such as catalytic cracking, it is desirable to reduce the initial alkali metal content of the crystalline aluminosilicate zeolites by replacing their alkali metal content with other metals or hydrogen-containing components which promote the desired conversion reaction. Typically, the alkali metal, e.g., sodium, content is reduced to levels below 10 weight percent, preferably below 4 weight percent and more preferably below 2 weight percent. Reduction of alkali metal content is readily accomplished in accordance with well known techniques by ion-exchange procedures wherein a desired cation is introduced into the zeolitic structure to replace the alkali metal cation initially present. Desirable cations include calcium, magnesium, hydrogen, lithium, manganese, lanthanum, cerium, and mixtures of the rare earth metals, etc. The rare earth metal cations are particularly preferred.

A wide variety of rare earth compounds can be employed as the source of rare earth ions. Operable compounds include rare earth chlorides, bromides, iodides, nitrates, acetates, sulfates, formates, and the like. The only limitation on a particular rare earth metal salt or salts employed is that it be sufficiently soluble in the fluid medium in which it is used to give the necessary rare earth ion transfer. The preferred rare earth salts are the chlorides, nitrates, and sulfates. Representative of the rare earth metals are cerium, lanthanum, praseodymium, neodymium, promethium, samarium, europium, gadolinium, terbium, dysprosium, holmium, erbium, yttrium, thulium, scandium, and lutecium. The rare earth metal salt employed can either be the salt of a single rare earth metal or mixtures of rare earth metals, such as rare earth chlorides or didymium chlorides. As hereinafter referred to, a rare earth chloride solution is a mixture of rare earth chlorides consisting essentially of the chlorides of lanthanum, cerium, neodymium, and praseodymium with minor amounts of samarium, gadolinium and yttrium. Rare earth chloride solutions are commercially available such as a mixture containing the chlorides of rare earth having the approximate composition cerium (as $CeO_2$) 48 percent by weight, lanthanum (as $La_2O_3$) 24 percent by weight, neodymium (as $Nd_2O_3$) 16 percent by weight, praseodymium (as $Pr_2O_3$) 5 percent by weight, and lesser amounts of samarium, gadolinium, and other rare earth oxides.

As with other exchangeable metal ions, the rare earth metal is preferably incorporated into the crystalline aluminosilicate zeolite by ion-exchange methods as known in the art. In a typical method, an alkali metal crystalline aluminosilicate is base exchanged by contacting with a 5–10% (wt.) rare earth chloride solution at 130°–190° F. for 2–24 hours, filtering, drying and calcining at 750°–1200° F. for 0.5–2.0 hours in ambient air. To achieve higher levels of exchange the process may be repeated. Additional descriptions of methods for incorporating one or more rare earth metals into the zeolite in accordance with the invention are set forth in U.S. Pat. Nos. 3,823,092; 3,609,103; 3,436,357, which are incorporated herein by reference. The rare earth metal content of the crystalline aluminosilicate zeolite will generally be in the range of 0–22 weight percent, preferably in the range of 14–22 weight percent based on the weight of the zeolite.

For use in petroleum hydrocarbon conversion such as catalytic cracking operations, it is important that the concentration of the components be adjusted to give maximum cracking to desirable products during the cracking operation and maximum conversion to $CO_2$ during the regeneration operation. In other words, the amount of CO oxidation promoter should be neither too high so as to impart significant dehydrogenation activity to the catalyst during catalytic cracking nor too low to promote adequate conversion of CO to $CO_2$ during regeneration. The total catalyst composition of the invention will, therefore, contain 2 to 100, preferably 8 to 50, parts per million (ppm) of the CO oxidation promoter component; 78 to 98, preferably 84 to 95, weight percent of the inorganic porous oxide matrix component; and 2 to 20, preferably 5 to 15, weight percent of the crystalline aluminosilicate zeolite component, based on the weight of the total composition. Of particular interest is a catalytic cracking composition comprising 2 to 100 ppm of metal or compound of a metal selected from the group consisting of platinum, palladium, iridium, rhenium or combinations thereof; 0.1 to 10 wt. % of alumina support material for said metal or compound thereof; 78 to 98 wt. % of a silica-alumina matrix binder; and 2 to 20 wt. % of a rare earth metal ion and hydrogen ion exchanged zeolite Y, based on the weight of the total composition. Preferably, the silica-alumina matrix will contain 10 to 27 wt. % alumina and sufficient hydrogen ion and/or rare earth metal ion will be exchanged with the zeolite to produce a material having a sodium level of less than about 2 wt. % (as $Na_2O$).

Particularly good cracking and carbon monoxide conversion characteristics are exhibited by the catalyst prepared in accordance with the present invention. The catalyst of the invention is prepared by first supporting the aforedescribed CO oxidation promoter on the aforedescribed inorganic porous oxide, most preferably alumina, and thereafter embedding the supported CO oxidation promoter and the aforedescribed crystalline aluminosilicate zeolite in the inorganic porous oxide, most preferably silica-alumina. Thus, the catalyst of the invention will comprise supported metal CO oxidation promoter particles and crystalline aluminosilicate particles embedded in an inorganic porous oxide matrix.

The supported CO oxidation promoter which is incorporated into the catalyst composition is prepared by known techniques such as impregnation and vapor deposition. Preferably, the CO oxidation promoter is supported on an inorganic porous oxide material by impregnation with a solution of a compound of one or more of the aforementioned metals in an amount sufficient to provide the desired concentration. For example, an aqueous solution of palladium nitrate and/or chloroplatinic acid may be contacted with a porous inorganic oxide support such as alumina, to produce a slurry which may thereafter be filtered, dried, calcined, and/or pre-reduced with hydrogen or other suitable reducing agents. The supported metal CO oxidation promoter so produced will then preferably be pulverized to a particle size smaller than 10 microns diameter size, preferably less than 1 micron diameter size. Optionally, the alumina may be pulverized before impregnating with the metals.

It is desirable to calcine the supported CO oxidation promoter prior to its combination with the crystalline aluminosilicate zeolite and matrix components. Such calcination tends to lock in the impregnated CO oxidation promoter on the porous oxide support. Accordingly, the CO oxidation promoter supported on the porous oxide base is preferably calcined in air at about 750°–1250°0 F. for several hours, e.g. 2–16 hours, prior to its combination with the zeolite and matrix components. After calcination, the supported CO oxidation promoter may be reduced with hydrogen at 700°–1000° F. for several hours in accordance with conventional practice. The supported CO oxidation promoter may also be reduced with hydrogen prior to calcination in air and subsequent combination with the zeolite and matrix components.

The supported CO oxidation promoter and crystalline aluminosilicate zeolite are thereafter embedded in the aforedescribed inorganic porous oxide matrix. This may be conveniently accomplished by dispersing the zeolite and the supported metal CO combustion promoter in a hydrogel of the matrix material to produce a composite which is spray dried, washed free of residual soluble salts and flash dried. For example, rare earth exchanged zeolite Y particles (usually less than about 5 microns) may be dispersed in impure silica-alumina hydrogel or prewashed silica-alumina hydrogel and thereafter blended with particles comprising the metal CO oxidation promoter supported upon an inorganic porous oxide such as alumina to produce a composite which is thereafter spray dried, washed and flash dried. If desired, the finished catalyst may also be sulfided in a conventional manner prior to use. Other methods for compositing the components of the invention are known to those skilled in the art and are meant to be included within the scope of this invention.

The feedstocks suitable for conversion in accordance with the invention include any of the well known feeds conventionally employed in hydrocarbon conversion processes. Usually they will be petroleum derived, although other sources such as shale oil, tar sands oil, and coal are not to be excluded. Typical of such feeds are heavy and light virgin gas oils, heavy and light virgin napthas, solvent extracted gas oils, coker gas oils, steam-cracked gas oils, cycle oils, deasphalted residua, etc.

For use in hydrocarbon conversion, the catalyst of the invention will be contacted with a hydrocarbon feedstock at a temperature in the range of about 500° to 1000° F., a pressure of 0 to 50 psig, a feed rate of 0.1 to 10.0 V/V/Hr. In a preferred embodiment, the catalyst of the invention will be employed for the catalytic cracking of a hydrocarbon feedstock at a temperature in the range of about 875° to 1000° F., pressure of 0 to 25 psig and a feed rate of 2 to 50 V/V/Hr. The catalytic cracking catalyst composition of the invention may be regenerated at conditions which include a temperature in the range of 1100° to 1400° F., preferably 1150° to 1325° F.

DESCRIPTION OF THE PREFERRED EMBODIMENTS

The following examples further illustrate the present invention. Unless otherwise specified, all percentages and parts are by weight.

EXAMPLE 1

A catalyst of the invention was prepared as follows: 1665 grams of a silica/alumina hydrogel (equivalent to 151.3 grams of silica-alumina having an alumina content of 13 weight percent) were blended with 600 cc $H_2O$ and colloid milled. Separately, 22.5 grams of rare earth exchanged "Linde" zeolite Y (RE-Y) on a dry basis (equivalent to 17.0 grams as H-Y) were slurried in 250 cc $H_2O$ and to this were added 0.67 grams of a commercially available reforming catalyst sold under the trade name of Cyanamid PHF-4. The PHF-4 catalyst which comprises 0.3% Pt had been pretreated with $H_2$ at 925° F. for 16 hours to reduce the Pt to elemental form and then ground to pass a 200 mesh screen. The zeolite employed herein was prepared by substantially completely exchanging the original alkali metal ions of the zeolite Y with a mixed rare earth chloride solution (about 10 weight percent cerium, 55 weight percent lanthanum, 20 weight percent neodymium, 10 weight percent praseodymium), filtering, drying and calcining the material 2 hours at 1000° F., and then repeating the treatment two more times. The zeolite after the final exchange contained 0.99 weight percent $Na_2O$ and 23.4 weight percent mixed rare earth oxides. The slurry of RE-Y and prereduced PHF-4 was added to the silica/alumina hydrogel and homogenized by colloid milling twice. The composite was oven dried at 230° F., ground and washed free of extraneous salts. The resulting catalyst was calcined in air at 1000° F. It is designated "A" in subsequent examples and comprises about 12 ppm Pt, 10% RE-Y and 90% silica/alumina.

EXAMPLE 2

This example describes the preparation of another catalyst of the invention. It was made in the manner of Example 1 except the amount of prereduced PHF-4 was increased. The catalyst of this example is designated "B" and was calcined in air at 1000° F. It comprises about 30 ppm Pt, 10% RE-Y and 90% silica-alumina.

EXAMPLE 3

This example describes the preparation of another catalyst of the invention. The catalyst was made in the manner of Example 1 except the PHF-4 catalyst was replaced with a composition comprising 0.3% Pt and 0.3% Ir on $Al_2O_3$. The catalyst of this example is designated "C" and was calcined in air at 1000° F. It comprises about 12 ppm Pt, 12 ppm Ir, 10% RE-Y and 90% silica-alumina.

EXAMPLE 4

This example describes the preparation of another catalyst of the invention. It was made in the manner of Example 1 except the PHF-4 catalyst was replaced with a composition comprising 0.3% Pt and 0.3% Re on $Al_2O_3$. This catalyst is designated "D" and was calcined in air at 1000° F. It comprises about 12 ppm Pt, 12 ppm Re, 10% RE-Y and 90% silica-alumina.

EXAMPLE 5

The catalysts of this example are all catalysts of the invention. They were made in similar fashion as catalysts "A," "C," and "D" except that the supported metal CO oxidation components were not prereduced with $H_2$. Instead, these metal CO oxidation components were calcined in air at 1000° F. prior to grinding and compositing with the RE-Y and silica-alumina hydrogel. The composite catalysts were each calcined at 1000° F. in air. They are designated "E," "F," and "G" and have the following compositions:

| Catalyst | Composition* |
|---|---|
| E | 10 ppm Pt/8.5% RE-Y/91.5% silica-alumina |
| F | 10 ppm Pt-10 ppm Ir/8.5% RE-Y, 91.5% silica-alumina |
| G | 10 ppm Pt-10 ppm Re/8.5% RE-Y/91.5% silica-alumina |

*The noble metals are assumed to be present as oxides.

EXAMPLE 6

Portions of Catalysts "A" through "G" were each steamed at 1400° F. for 16 hours at 0 psig and then used as catalysts in a batch fluid bed reactor cracking a 500°–700° F. virgin gas oil at 950° F. over a 2 minute cracking cycle. The results are summarized in the following table at a constant 75% conversion for comparison purposes.

| Catalyst at 75% Conversion | A | B | C | D | E | F | G |
|---|---|---|---|---|---|---|---|
| W/Hr/W* | 12.3 | 10.5 | 13.4 | 12.2 | 9.9 | 9.8 | 6.6 |
| Carbon, Wt. % | 1.8 | 2.8 | 1.8 | 2.2 | 2.1 | 1.6 | 3.3 |
| $C_3$-Gas, Wt. % | 5.9 | 6.1 | 6.0 | 6.1 | 6.2 | 6.6 | 9.1 |
| Total $C_4$, Wt. % | 8.6 | 8.7 | 8.6 | 8.1 | 8.5 | 9.7 | 9.8 |
| $C_5$/430° F., Wt. % | 58.7 | 57.4 | 58.6 | 58.6 | 58.2 | 57.1 | 52.8 |
| $C_3H_6$, Wt. % | 3.7 | 3.5 | 3.8 | 3.7 | 3.6 | 3.9 | 4.6 |
| $H_2$, SCF/B | 33 | 39 | 45 | 38 | 37 | 39 | 63 |

*Space velocity required to attain 75% conversion.

The data show that all of the catalysts, "A" through "G," remain active and selective and do not show excessive amounts of coke, free hydrogen, and olefins with the possible exception of catalyst "G." The data show the use of the metals in prereduced form as in catalysts "A" through "D" show no ill effects of the noble metals in a normal cracking operation. Normal hydrogen yields with catalysts having no noble metals present would yield about 25–35 SCF/B in the above test so it is seen that "A" through "G" do not make excessive amounts of $H_2$.

Catalysts "E," "F," and "G" show slightly lower activity than catalysts "A"–"D" due to their lower RE-Y contents. In these catalysts the noble metals were preserved in their oxidized states (as oxides, presumably). Only catalyst "G" shows a drop in activity with increases in coke and $H_2$ makes a loss in naphtha yield, although these changes in yield pattern are not considered excessive but merely directional. Normal equilibrium catalysts of conventional types (without added noble metals) and comprising several hundred ppm nickel and vanadium show hydrogen yields of about 40–60 SCF/B $H_2$.

EXAMPLE 7

Catalysts "A" through "G" were subjected to a simulated regenerator flue gas to demonstrate their capabilities for oxidizing CO to $CO_2$. In the experiment, 10 grams of the catalyst present as a fluid bed was contacted with $N_2$ for 10 minutes at 1150° F. to flush other gases from the system and then the regenerator flue gas passed through the system at a rate of 250 cc/minute for 8 minutes. At the end of the period a sample of the exit gas was analyzed by mass spectrograph for composition. Two sets of experiments were conducted: (a) with the fresh catalysts calcined at 1000° F. in air before testing, and (b) with the catalysts presteamed at 1400° F. for 16 hours and 0 psig. In the latter set the possibility exists that the noble metals would agglomerate in large crystals and thus be rendered ineffective as oxidation catalysts. The simulated regenerator flue gas comprised air, CO, $CO_2$, and added nitrogen. The amount of oxygen (as air) was not sufficient to stoichiometrically convert all of the CO to $CO_2$. The results follow for each set of experiments.

| CATALYSTS HEATED AT 1000° F. IN AIR; TESTS AT 1150° F. | | | | | | | | |
|---|---|---|---|---|---|---|---|---|
| Catalyst Product Analysis, Mol. % | A | B | C | D | E | F | G | Composition Feed Gas, Mol % |
| $O_2$ | 0.00 | 0.04 | 0.03 | 0.00 | 0.00 | 0.00 | 1.65 | 3.48 |
| CO | 1.95 | 1.85 | 0.82 | 0.00 | 0.00 | 0.90 | 1.67 | 8.53 |
| $CO_2$ | 19.58 | 19.73 | 20.56 | 20.07 | 19.75 | 20.53 | 18.35 | 12.00 |
| $N_2$ | 78.77 | 78.38 | 78.59 | 79.93 | 80.25 | 78.57 | 78.33 | 75.99 |

CATALYSTS HEATED AT 1000° F. IN AIR; TESTS AT 1150° F. -continued

| Catalyst Product Analysis, Mol. % | A | B | C | D | E | F | G | Composition Feed Gas, Mol % |
|---|---|---|---|---|---|---|---|---|
| % CO Oxidized* | 95.8 | 97.3 | 100 | 100 | 100 | 100 | 98.0 | |

*Theoretical excess CO = 1.57 mol % due to insufficient $O_2$ in feed gas.

The data show in all cases that the catalysts are extremely effective in converting CO to $CO_2$ and that with catalysts "C," "D," "E," and "F" the oxidation was quantitative. This is particularly surprising when you consider that as the $O_2$ supply is depleted the reaction still proceeds to completion with the noble metal level of the composite catalyst only in the 10–30 ppm range. The cracking data demonstrate clearly that the catalysts are highly active and selective, and do not yield excessive amounts of coke and free hydrogen.

In another set of experiments, catalysts "A" through "G" were each steamed at 1400° F. for 16 hours and 0 psig pressure. The catalysts were then each charged to a reactor at 1150° F., purged with flowing nitrogen and then subjected to flowing simulated regenerator flue gas for 10 minutes as described above. The results follow.

| Catalyst Product Analysis, Mol. % | Catalyst Steamed 16 Hours at 1400° F. and 0 Psig. Tests at 1150° F. | | | | | | | Feed Gas |
|---|---|---|---|---|---|---|---|---|
| | A | B | C | D | E | F | G | |
| $O_2$ | 0.00 | 0.00 | 0.18 | 0.00 | — | 0.16 | — | 3.48 |
| CO | 0.99 | 1.39 | 1.29 | 1.15 | 0.99 | 0.00 | 1.67 | 8.53 |
| $CO_2$ | 20.45 | 20.45 | 20.16 | 20.52 | 19.98 | 19.58 | 20.11 | 12.00 |
| $N_2$ | 78.56 | 78.16 | 78.37 | 78.33 | 78.38 | 80.26 | 77.93 | 75.99 |
| % CO Oxidized* | 100 | 100 | 100 | 100 | 100 | 100 | 98.8 | |

*Theoretical excess CO = 1.57 mol. % due to insufficient $O_2$ in feed gas.

The data show, again, that the oxidation of CO to $CO_2$ is effected essentially quantitatively. This demonstrates that the steaming of the catalysts did not render the noble metals to a non-catalytic form. Hence the cracking results with the steamed catalysts of the examples are made valid by the fact that the noble metals in catalysts A through G are still effective CO oxidation catalysts and do not adversely effect the performance of the catalysts in cracking operation.

The data shown in the examples demonstrate that the noble metal may be Pt alone or Pt/Ir and Pt/Re combinations, all of which are extremely effective as catalysts of this invention.

EXAMPLE 8

Two of the catalysts of this example are catalysts of the claimed invention, i.e., they were prepared by first supporting a CO oxidation promoter on an inorganic porous oxide base and thereafter embedding the supported CO oxidation promoter and a crystalline aluminosilicate zeolite in an inorganic porous oxide matrix. The other two catalysts of this example have compositions which are similar to those of the catalysts of the claimed invention, however, they were not prepared according to the technique outlined in the claimed invention.

The catalysts of the claimed invention are designated H and I and the catalysts prepared for comparative purposes are designated J and K. Catalyst H was prepared by compositing RE-Y and silica-alumina hydrogel and suspending therein sufficient ground preformed reforming catalyst (0.3% Pt on $Al_2O_3$) to make the equivalent of about 15 ppm Pt on the total catalyst. The composite mixture was spray dried, washed, dried and then steamed 16 hours at 1400° F. and 0 psig. The final catalyst had a composition of about 8.5% RE-Y/0.5% $Al_2O_3$/15 ppm Pt/91% $SiO_2$-$Al_2O_3$. The platinum is all contained on the small amount of added bulk alumina.

Catalyst I is the preferred catalyst of the invention. It was prepared by mixing RE-Y and silica-alumina gel and then blending with a bulk alumina which had been previously uniformly impregnated with dilute chloroplatinic acid solution, dried, and calcined at 1000° F. It comprises 11% RE-Y/29% $Al_2O_3$/60% $SiO_2$-$Al_2O_3$/15 ppm Pt. In this catalyst all of the Pt oxidation promoter was supported on the bulk alumina. Catalyst I was dried, washed, calcined and steamed at 1400° F. for 16 hours and 0 psig.

Catalyst J was prepared by impregnating commercial cracking catalyst comprising 8.5% RE-Y/91.5% $SiO_2$-$Al_2O_3$ with a very dilute chloroplatinic-acid solution to provide 15 ppm Pt on the total catalyst. The catalyst was dried, calcined at 1000° F. and then steamed 16 hours at 1400° F. and 0 psig.

Catalyst K was prepared by impregnating a cracking catalyst sold under the designation CBZ-1 by the Davison Chemical Division of W. R. Grace and Company and having an approximate composition of 15% RE-Y/30% kaolin/55% $SiO_2$-$Al_2O_3$ with a very dilute solution of chloroplatinic acid. After drying and calcining at 1000° F., the catalyst was steamed for 16 hours at 1400° F. and 0 psig. This catalyst contained about 15 ppm Pt uniformly dispersed throughout the catalyst.

Steamed catalysts H, I, J and K were each (10 grams) charged to a reactor operated at 1150° F., purged with pure nitrogen while coming up to temperature and then contacted with a simulated flue gas flowing at a rate of 200 cc/min for 20 minutes with the effluent gas from the reactor passing continuously through a gas sample bomb. After 20 minutes the effluent gas was sealed off in the bomb and analyzed for CO content. The simulated regeneration gas was comprised of 9.98 mole % CO and 10.0 mole % $CO_2$, a stoichiometric amount of oxygen (as air) to oxidize the CO to $CO_2$ and the balance nitrogen. The tabulated results follow.

| Catalyst | H | I | J | K |
|---|---|---|---|---|
| Catalyst of invention | yes | yes | no | no |
| % of CO oxidized | 100 | 99.3 | 97.1 | 96.8 |

The foregoing results show that catalysts H and I, catalysts of the claimed invention, give superior performance when compared to conventional catalysts. Catalysts H and J approximate each other in composition, differing only in having the platinum dispersed uniformly over the whole catalyst in catalyst J versus having the platinum supported on $Al_2O_3$ which is then dispersed throughout the total catalyst in catalyst H. Catalysts I and K approximate each other in composition except that catalyst K has kaolin as the inert material and the platinum is dispersed over the whole catalyst composite, whereas catalyst I has the platinum supported uniformly on an inert porous alumina and this material is then imbedded in the total composite catalyst.

What is claimed is:

1. A hydrocarbon conversion catalyst which comprises particles of crystalline aluminosilicate zeolite and particles of a porous oxide support containing a CO oxidation promoter, which particles are each embedded in a porous oxide matrix to produce a catalyst composite thereof containing 2 to 20 wt. % of the zeolite and 2 to 100 ppm of a CO oxidation promoter comprising a metal or a compound of a metal selected from Periods 5 and 6 of Group VIII of the Periodic Table, rhenium, chromium, manganese and combinations thereof.

2. The catalyst of claim 1 wherein said CO oxidation promoter is selected from the group consisting of platinum, palladium, rhodium, rhenium, iridium, and combinations thereof.

3. The catalyst of claim 2 wherein said matrix is selected from the group consisting of silica, alumina, magnesium, zirconia, kaolin and montmorillonite, clays and combinations thereof.

4. The composition of claim 3 wherein said CO oxidation promoter is selected from the group consisting of platinum, palladium, rhodium, iridium, rhenium, and combinations thereof.

5. The composition of claim 4 wherein said support is alumina and said matrix is silica-alumina.

6. The composition of claim 5 wherein said crystalline aluminosilicate zeolite has an $Na_2O$ level below 4 weight percent and contains rare earth metal ions.

7. A cracking catalyst for promoting the oxidation of CO to $CO_2$ during regeneration of the catalyst by the burning of coke therefrom, prepared by first supporting a CO oxidation promoter selected from Periods 5 and 6 of Group VIII of the Periodic Table, rhenium, chromium, manganese, and combinations thereof on a porous oxide support and thereafter dispersing the supported CO oxidation promoter and a crystalline aluminosilicate zeolite in a porous oxide matrix to form a composite thereof containing 2 to 100 ppm of said CO oxidation promoter.

8. The cracking catalyst of claim 7 wherein said CO oxidation promoter is selected from the group consisting of platinum, palladium, rhodium, rhenium, iridium and combinations thereof and said crystalline aluminosilicate zeolite contains rare earth metal ions.

9. The cracking catalyst of claim 8 wherein said support is aluminum and said matrix is silica-alumina.

10. The cracking catalyst of claim 9 wherein said supported CO oxidation promoter is calcined prior to combination with said zeolite and matrix.

* * * * *